United States Patent
Hardy et al.

[11] Patent Number: 6,089,044
[45] Date of Patent: Jul. 18, 2000

[54] PROCESS FOR MAKING PREFORMS FOR MULTICORE OPTICAL FIBERS

[75] Inventors: Isabelle Hardy, Louannec; Daniel Boscher, Trebeurden; Philippe Grosso, Lannion, all of France

[73] Assignee: France Telecom, Paris, France

[21] Appl. No.: 09/036,069

[22] Filed: Mar. 6, 1998

[51] Int. Cl.[7] ............... C03B 37/027; C03B 37/028
[52] U.S. Cl. .............. 65/408; 65/410; 65/411; 65/36
[58] Field of Search ............... 65/410, 411, 408, 65/409, 56, 36

[56] References Cited

U.S. PATENT DOCUMENTS

| | | | |
|---|---|---|---|
| 3,350,183 | 10/1967 | Sigmund | 65/411 |
| 3,455,666 | 7/1969 | Bazinet | 65/410 |
| 3,455,667 | 7/1969 | Snitzer | 65/411 |
| 3,535,017 | 10/1970 | Miller | 65/409 |
| 3,930,714 | 1/1976 | Dyott . | |
| 4,026,693 | 5/1977 | Sato | 65/410 |
| 4,444,463 | 4/1984 | Schneider | 65/410 |
| 4,682,849 | 7/1987 | Kowata | 65/411 |
| 4,902,324 | 2/1990 | Miller | 65/411 |
| 5,318,612 | 6/1994 | Le Noane et al. . | |
| 5,519,801 | 5/1996 | Le Noane et al. . | |

FOREIGN PATENT DOCUMENTS

| | | |
|---|---|---|
| 519834 A1 | 12/1992 | European Pat. Off. . |
| 611973 A1 | 8/1994 | European Pat. Off. . |
| 713844 A1 | 5/1996 | European Pat. Off. . |
| 2688318 | 9/1993 | France . |

OTHER PUBLICATIONS

English Abstract of JP 5713576 Aug. 1982.
English Abstract of JP 62091438 Apr. 1987.

*Primary Examiner*—John Hoffmann
*Attorney, Agent, or Firm*—Pearne, Gordon, McCoy & Granger LLP

[57] ABSTRACT

Process for making preforms for multicore optical fibers. According to this process, several elementary preforms are made, a first machining is performed on them such that a chosen geometric model will be obtained after they are assembled, a second machining is performed such that the assembly (11) has at least one hole (12), the preforms are assembled and an induction furnace (18) is used to fuse the preforms, while creating a vacuum in each hole.

11 Claims, 2 Drawing Sheets

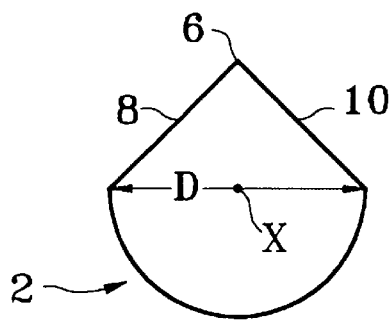
FIG. 1
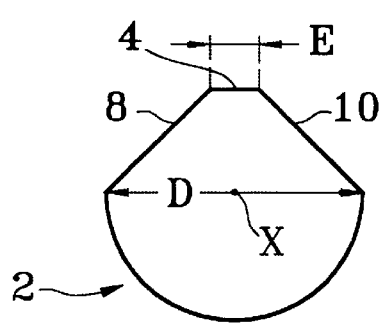
FIG. 2
FIG. 3
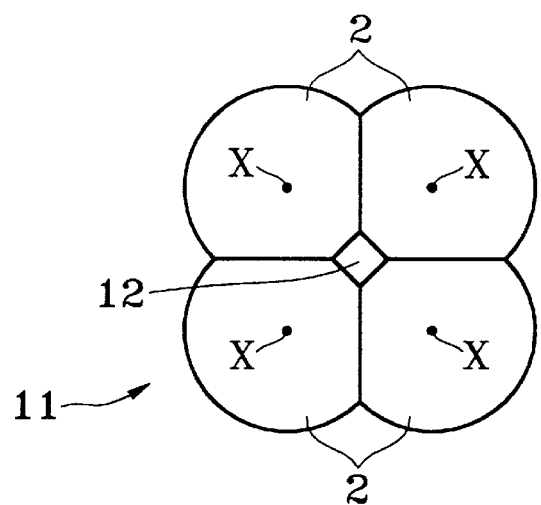
FIG. 5
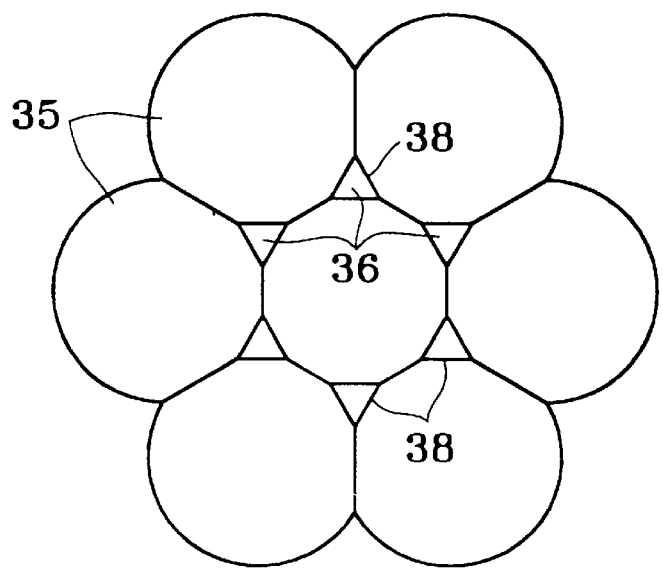

PROCESS FOR MAKING PREFORMS FOR MULTICORE OPTICAL FIBERS

DESCRIPTION

1. Technical Field

This invention relates to a process for making preforms for multicore optical fibers.

It is particularly applicable to the domain of telecommunications using optical fibers and more particularly to the production of multicore optical fibers for a distribution network.

2. State of Prior Art

A process for manufacturing preforms for multicore optical fibers has already been described in document (1) which, like the other documents mentioned later, is included in the references at the end of this description.

Refer to this document (1).

According to document (1), an assembly of elementary preforms is made and a bar is welded to one end of this assembly, to form a starter for drawing.

This assembly is fibered without the elementary preforms being welded to each other, since these preforms are melted during fibering.

Consequently, it is necessary to perform fibering at high temperature and therefore to deform the multicore preforms beyond acceptable limits, in order to weld the elementary preforms and to deform the assembly to produce a multicore fiber homothetic with this assembly.

According to document (2), a multicore preform is obtained by recharging elementary preforms assembled around a silica core, using silica grains.

In this case, it is very difficult to obtain a homogeneous multicore optical fiber and consequently the mechanical strength of this fiber is unsatisfactory.

DESCRIPTION OF THE INVENTION

The purpose of this invention is to overcome the disadvantages mentioned above.

Its purpose is a process for manufacturing undeformed and sufficiently homogeneous (perfectly welded) multicore preforms to obtain multicore optical fibers with very good geometric characteristics and a very good mechanical strength, by fibering.

Specifically, the purpose of this invention is a process for making a multicore preform designed to make a multicore optical fiber by drawing this preform, this process being characterized in that it comprises the following steps:
a number of elementary preforms are made,
these elementary preforms are machined a first time such that when they are assembled, the geometric model chosen for the multicore optical fiber is obtained,
the elementary preforms are machined again, so that the assembly has at least one longitudinal hole,
the elementary preforms thus machined are assembled in accordance with the chosen geometric model, and,
an induction furnace, preferably horizontal is used capable of increasing the assembly to its melting temperature and with respect to which this assembly, for example mounted in a glass worker's lathe, is subject to translation and rotation movements to heat the assembly and weld the elementary preforms to each other, while applying a vacuum to each hole, each hole disappearing by collapsing when the elementary preforms are welded to each other.

Preferably, the assembly is predrawn by a few tens of millimeters, precisely and regularly while it is heated.

For example, the assembly predrawing speed may be of the order of 4 mm/min.

Admittedly, document (3) in the reference describes an induction furnace that can be used in this invention.

However, in this document (3), this induction furnace is only used for a chemical vapor phase deposition in a silica tube and to collapse this tube to obtain a solid bar.

This document (3) does not mention welding an assembly of elementary preforms.

To demonstrate the advantage of the invention, as an example it will be shown that direct fibering deforms the fiber by about 3%, for a mechanical strength of 3.5 daN (decanewtons), since it is necessarily done "hot" (the fibering tension is equal to 40 g).

When the process according to the invention is used, the deformation of the multicore fiber does not exceed 7°/∞ (per mill) and the mechanical strength has a typical value of close to 5 daN.

According to one preferred embodiment of the process according to the invention, the elementary preforms are manufactured with high precision, this precision being compatible with what is required for the multicore fiber, as explained in document (1):
definition of the positions of elementary optical guides in the multicore fiber, within a few tenths of a micrometer,
definition of the core diameter and the optical cladding diameter in these elementary guides, within a few tenths of a micrometer, and
eccentricity between this core and this optical cladding of the order of a tenth of a micrometer.

Note that document (4) describes a very high precision process that can be used to make elementary preforms.

According to one specific embodiment of the process according to the invention, the first machining includes formation of one of several flats parallel to the center line of the preform, on each elementary preform, enabling the assembly of elementary preforms in accordance with the chosen geometric model.

According to one specific embodiment, four elementary preforms are made with the same outside diameter, the first machining includes the formation of two longitudinal and perpendicular flats that define a sharp edge on each elementary preform, so that the result of assembling the elementary preforms is a multicore preform with four cores, and the second machining includes the formation of a chamfer on the sharp edge of each elementary preform so that the assembly includes a central longitudinal hole.

In this case, the width of the chamfer on each elementary preform is preferably of the order of 5% of the diameter of this elementary preform.

The assembly may include N elementary preforms of the same outside diameter, where N is an integer not equal to 4.

In this case, the second machining may include the formation of at least one chamfer on each elementary preform, the chamfers being chosen to obtain longitudinal holes in the assembly and to break the sharp edges of the elementary preforms.

The induction furnace is preferably horizontal.

The horizontal induction furnace described in document (3) is used, which comprises a graphite or zirconium susceptor.

Preferably, a bar and a tube are welded to the two ends of the assembly, the tube being used to create a vacuum in each hole.

The vacuum applied to each hole may for example be equal to −30 mbars (about −3000 Pa).

The translation speed of the assembly with respect to the furnace may be equal to 15 mm per minute.

BRIEF DESCRIPTION OF THE DRAWINGS

This invention will be better understood by reading the following description of example embodiments, given for guidance only and in no way restrictive, with reference to the attached drawings in which:

FIG. 1 is a schematic cross-sectional view of an elementary preform that can be used in this invention to form a preform with four cores, FIG. 2 is a schematic cross-sectional view of the preform in FIG. 1, which has been chamfered for the purposes of the invention, FIG. 3 is a schematic cross-sectional view of an assembly with four preforms with the same outside diameter, FIG. 4 schematically illustrates an induction furnace for use with the invention, and, FIG. 5 is a schematic cross-sectional view of an assembly comprising seven elementary preforms, that can be used in an embodiment of the invention.

DETAILED DESCRIPTION OF SPECIFIC EMBODIMENTS

Figure 4:
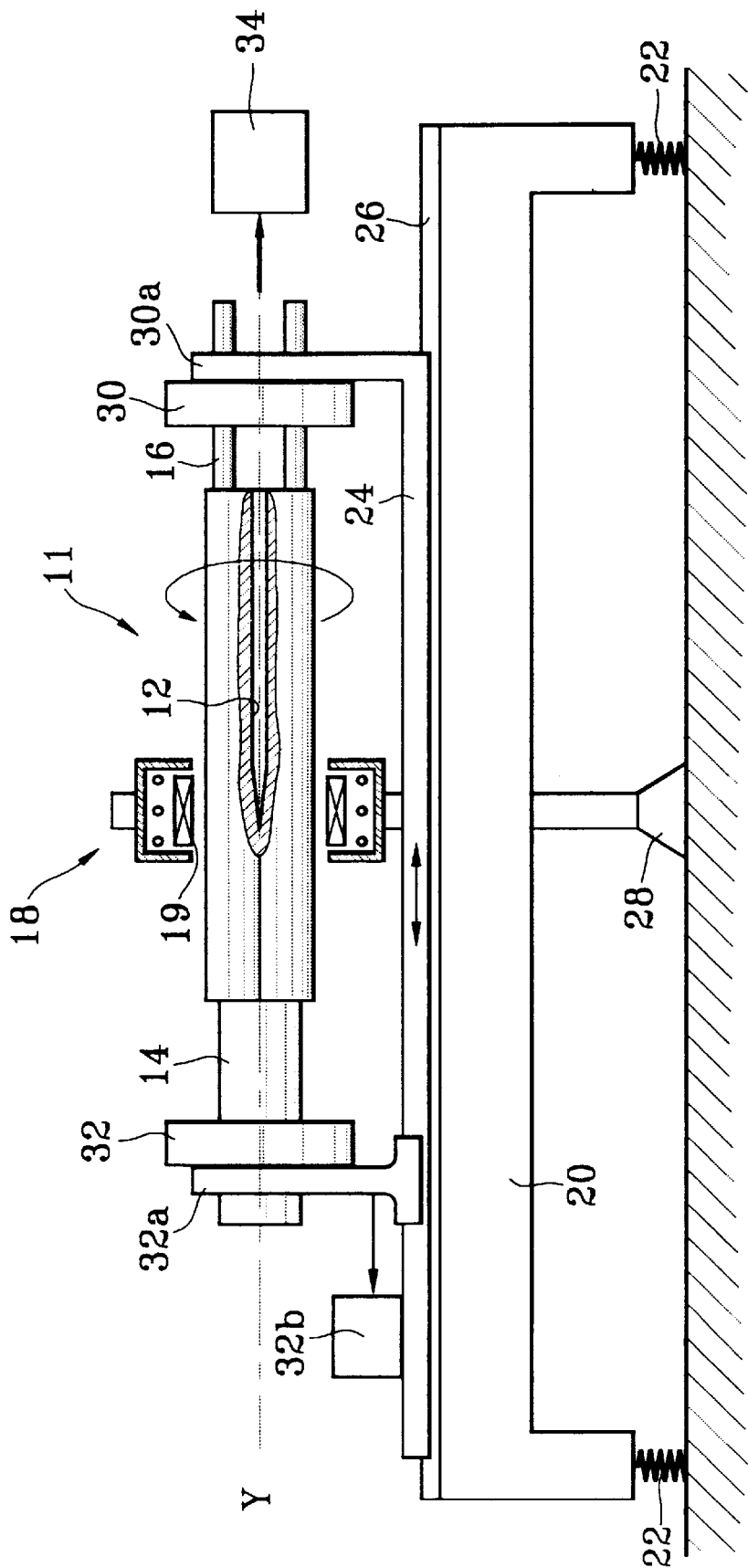

An example embodiment of the invention is described below, which can be used to make a preform with four cores, which can be drawn up to obtain an optical fiber with four cores.

This is a preform for which the geometric model is identical to that of the assembly shown in FIG. 3 in document (1).

This preform with four cores is also of the type that can be drawn to give the multicore optical fiber shown in FIG. 9 in this document (1).

The first step in making the preform with four cores is to make four elementary cylindrical preforms with the same outside diameter and high precision, with a single core.

This high precision is applicable to the deflection, the eccentricity and diameter of the core, the diameter of the optical cladding and the longitudinal geometric regularity of each preform.

This high precision is chosen so as to obtain the required high precision for the multicore fiber after the manufactured multicore preform has been drawn.

The first machining step is then performed on each elementary preform.

Note briefly that this machining consists of making two longitudinal flats on each elementary preform perpendicular to each other and parallel to the center line of this elementary preform, as explained in document (1) in relation with FIGS. 3 and 4 in this document (1).

FIG. 1 in the attached drawings schematically shows a cross-section of the profile thus obtained for each elementary preform 2.

After this first machining, a second machining is done on each elementary preform 2.

This second machining consists of forming a chamfer 4 at the sharp edge 6 (FIG. 1) on each elementary preform 2.

This chamfer 4, which thus forms a small flat parallel to the longitudinal X-axis of the elementary preform 2, is perpendicular to the plane bisecting the dihedron defined by the two previously machined flats 8 and 10.

The width E of this flat 4 is approximately equal to 5% of the nominal diameter D (outside diameter) of the elementary preform 2.

The four elementary preforms 2 are then assembled as shown schematically in the cross-section in FIG. 3 in the attached drawings.

The assembly 11 shown in FIG. 3 leaves a central longitudinal hole 12 parallel to the X-axis of each of the elementary preforms 2, this hole being delimited by four surfaces that are composed of the four flats 4 of the preforms 2.

According to this invention, this assembly is then welded to obtain the preform with four cores to be made.

The next step is to draw this preform with four cores to produce a multicore optical fiber with four cores.

Geometric and mechanical measurements can then be made on this optical fiber with four cores.

The assembly 11 is welded using an induction furnace capable of increasing the temperature of this assembly to its melting temperature.

In the example shown, the elementary preforms are made of silica and the induction furnace used is capable of heating the assembly to a temperature exceeding 2000° C.

The required welding is made using the horizontal induction furnace described in document (3).

This induction furnace is schematically shown in FIG. 4 in the attached drawings.

Before doing this welding, a silica cylindrical bar 14 with the same Y-axis as the assembly is welded to one end of the assembly 11, this Y-axis also being the axis of the central hole 12.

A silica tube 16 with the same Y-axis is welded to the other end of the assembly 11.

The inside diameter of this tube is sufficiently large to surround the end of hole 12 located at the tube 16 end and its outside diameter is sufficiently small so that the entire outside wall of this tube 16 is in contact with the corresponding end of assembly 11.

The assembly 11, fitted with bar 14 and tube 16, is mounted in the glass worker's lathe associated with the induction furnace 18.

The susceptor 19 of this induction furnace is made of graphite or zirconium as described in document (3).

This glass worker's lathe is very schematically shown in FIG. 4 in the attached drawings.

Briefly, it comprises:

a fixed rigid support 20, the ends of which are mounted on damping means 22, another rigid support 24 that can be translated along a slide 26 fitted on support 20, a fixed support 28 on which the induction furnace 18 is mounted, and two coaxial mandrels 30 and 32 mounted on the movable support 24 and located on each side of the induction furnace 18.

This glass worker's lathe has been modified in the example shown; the mandrel 32 is mounted on a mobile headstock 32a that can be moved horizontally, precisely and uniformly, along the support 24 by means of a motor 32b, to precisely predraw the assembly in a controlled manner while it is being welded.

The mandrel 30 is mounted on a headstock 30a fixed with respect to support 24.

FIG. 4 shows that the assembly 11 passes through the induction furnace susceptor 19 and that mandrel 30 holds the tube 16, while the other mobile mandrel 32 holds the bar 14.

Pumping means 34 are provided with the glass worker's lathe in order to create a vacuum in tube 16 and therefore in the central hole 12.

These pumping means 34 are attached to tube 16 by a rotating sealed connector not shown.

These pumping means 34 are provided to create a partial vacuum of the order of −3000 Pa in this central hole.

The glass worker's lathe (including motor 32b) is put into operation to control the two mandrels and therefore to apply a rotation movement of about 15 rpm to the assembly of elementary preforms, and to apply a translation movement to mandrel 30 at a speed of about 15 mm/minute with respect to support 20, and a translation movement to mandrel 32 at a speed of about 20 mm/minute with respect to support 20, to predraw the assembly during the welding operation and thus create transverse return forces that are additional to the collapsing forces created by the vacuum that will be described later.

Furthermore, the temperature of the induction furnace is increased to about 2200° C.

In FIG. 4 in the attached drawings, the translation movement of the elementary preforms assembly 11 with respect to the induction furnace is from the right towards the left, the end of this assembly which is welded to bar 14 initially being in the induction furnace.

This translation movement also moves the entire assembly through the induction furnace.

As it passes through the induction furnace, the elementary preforms are slightly drawn and welded to each other, and the central hole disappears by collapsing.

This collapse is facilitated by the vacuum applied in the central hole by means of tube 16 and by slight predrawing of the assembly during the welding operation.

If required, the assembly can be passed through the furnace several times to improve welding of the elementary preforms.

The required preform with four cores is obtained after cooling.

Note that the distortion caused by welding the assembly is negligible (less than 2°/∞).

A check is made on 100 measurements made on five assemblies, to ensure that initial and final distortions are very similar.

The difference represents the area of the hole lost at the periphery and the predrawing done (a few centimeters for 25 cm).

Note also that when the preform with four cores thus obtained is drawn after the assembly was perfectly welded (with no interface bubbles) tension conditions are chosen so as to not increase the distortion due to welding by more than 20°/∞.

These tension conditions are similar to quite conventional fibering tensions (typically equal to 80 g) and the mechanical strength is the same as that of a single mode circular fiber with a single core.

This invention is not limited to the production of a preform with four cores.

It is also applicable to the production of preforms with more than four cores or even two or three cores, of the type that would give multicore fibers schematically shown in cross-section in FIGS. 7, 8 and 10 to 13 in document (1).

Thus assemblies of elementary preforms comprising several longitudinal holes parallel to the center lines of these elementary preforms may be made in accordance with the invention.

This is schematically illustrated in the cross-section in FIG. 5 in the attached drawings, in which an assembly of elementary preforms 35 can be seen, and which after being welded in the glass worker's lathe mentioned above, produces a multicore preform that can be drawn to give an optical fiber with seven cores of the type schematically shown in FIG. 10 in document (1).

FIG. 5 in the attached drawings shows that the assembly then comprises six longitudinal holes 36 parallel to each other.

To obtain these holes, the first step is to do the first machining of the seven elementary preforms to form the required flats on them, and then the necessary chamfers 38 are formed at the sharp edges of each elementary preform.

After these elementary preforms in FIG. 5 have been assembled, six holes 36 are obtained, each delimited by three chamfers 38.

Note that in order to facilitate welding in the glass worker's lathe induction furnace, the silica tube is firstly chosen and welded so that the internal wall of this tube surrounds all the six longitudinal holes thus formed so that a vacuum can be created in these six longitudinal holes through this tube.

In an embodiment not shown, the glass worker's lathe in document (3) is used with headstock 32a fixed with respect to support 24.

In this case, no predrawing is done.

However, this predrawing is preferable for the reasons given above.

The following documents are mentioned in this description:

(1) FR-A-2 701 571, "Guides optiques multicoeurs de grande precision et de petites dimensions et procédé de fabrication de ces guides"—(High precision small dimension multicore optical guides and process for manufacturing these guides), invention by Georges Le Noane, Philippe Grosso and Isabelle Hardy, corresponding to EP-A-O 611 973 and U.S. Pat. No. 5,519,801.

(2) FR-A-2 688 318 "Conducteur optique multiguides" (Multiguide optical conductor), ALCATEL CABLE.

(3) FR-A-2 677 972, "Procede et dispositif pour la fabrication de preformes pour fibres optiques" (Process and device for making preforms for optical fibers) invention by Georges Le Noane and Isabelle Hardy) corresponding to EP-A-0 519 834 and U.S. Pat. No. 5,318,612.

(4) EP-A-0 519 834, "procede et dispositif pour la fabrication de preformes pour fibres optiques" (process and device for making preforms for optical fibers).

What is claimed is:

1. Process for making a multicore preform designed to make a multicore optical fiber by drawing this preform, this process being characterized in that it comprises the following steps:

a plurality of elementary preforms (2, 35) are made, a first machining of these elementary preforms is carried out such that when they are assembled, a geometric model chosen for the multicore optical fiber is obtained, a second machining of the elementary preforms is carried out so that the assembly (11) of these elementary preforms has at least one longitudinal hole, the elementary preforms thus machined are assembled in accordance with the chosen geometric model, and, an induction furnace (18) raising the assembly to a melting temperature of said assembly and with respect to which this assembly is subject to relative translation and rotation movements for heating said assembly and welding the elementary preforms to each other, while applying a vacuum to each hole, each hole disappearing by collapsing during said welding.

2. Process according to claim 1, in which while the assembly is heated, the assembly is predrawn to increase its length by a few tens of millimeters.

3. Process according to claim 1, in which the first machining includes forming at least one flat (8, 10) on each elementary preform parallel to the (X) axis of this preform, said at least one flat making it possible to assemble the elementary preforms in accordance with the chosen geometric model.

4. Process according to claim 3, in which four elementary preforms (2) with the same outside diameter are made, the first machining comprising forming two longitudinal flats (8, 10) perpendicular to each other and defining an edge (6) on each elementary preform, so that a multicore preform with four cores can be obtained by assembling the elementary preforms, and the second machining comprising forming a chamfer (4) on the edge of each elementary preform such that the assembly comprises a longitudinally extending central hole (12).

5. Process according to claim 4, in which the width of the chamfer (4) on each elementary preform is of about 5% of the outside diameter of each elementary preform.

6. Process according to claim 3, in which the assembly comprises N elementary preforms (35) with the same outside diameter, where N is an integer not equal to 4, the first machining comprises forming longitudinal flats defining edges on each elementary preform, and the second machining comprises forming at least one chamfer (38) on each elementary preform, the chamfers being chosen to obtain longitudinal holes in the assembly and to cut off said edges.

7. Process according to claim 1, in which the induction furnace (18) comprises a graphite or zirconium susceptor (19).

8. Process according to claim 1, in which the furnace is horizontal.

9. Process according to claim 1, in which a bar (14) and a tube (16) through which the vacuum is created in each hole, are welded to the two ends of the assembly.

10. Process according to claim 1, in which the vacuum is approximately equal to −3000 Pa.

11. Process according to claim 1, in which the translation speed of the assembly (11) with respect to the furnace is approximately equal to 15 mm per minute.

* * * * *

UNITED STATES PATENT AND TRADEMARK OFFICE
CERTIFICATE OF CORRECTION

| | | |
|---|---|---|
| PATENT NO. | : 6,089,044 | Page 1 of 1 |
| APPLICATION NO. | : 09/036069 | |
| DATED | : July 18, 2000 | |
| INVENTOR(S) | : Isabelle Hardy et al. | |

It is certified that error appears in the above-identified patent and that said Letters Patent is hereby corrected as shown below:

Column 1, Line 9 item [30], the Priority Information was omitted and should be inserted into front page of the letters patent --French Application No. 9702793, Filed on March 10, 1997--.

Signed and Sealed this

Thirtieth Day of December, 2008

JON W. DUDAS
*Director of the United States Patent and Trademark Office*